May 26, 1959  A. PASSAROTTI  2,887,833
TOOL GRINDING JIG
Filed April 3, 1958
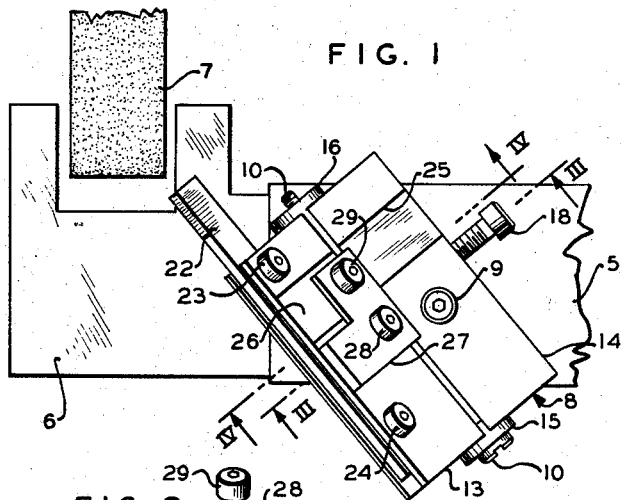
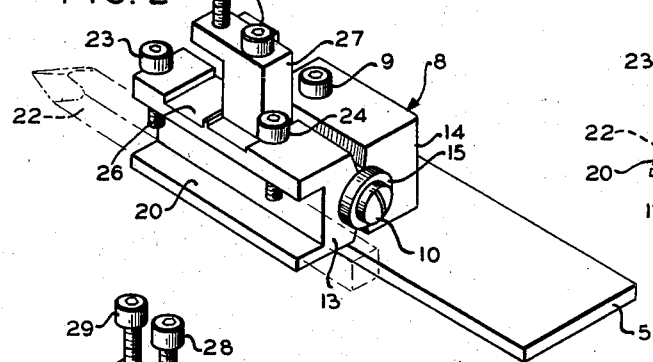
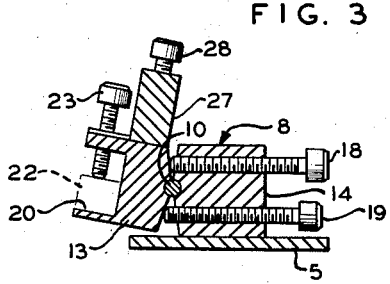
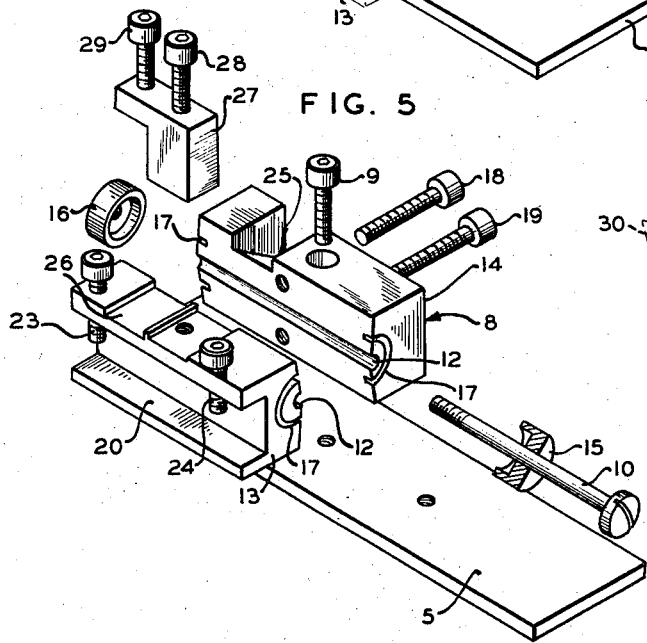
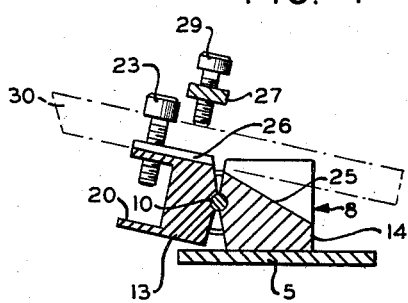
*INVENTOR.*
ANTHONY PASSAROTTI
ATTORNEY

United States Patent Office 2,887,833
Patented May 26, 1959

2,887,833
TOOL GRINDING JIG

Anthony Passarotti, North Bergen, N.J.

Application April 3, 1958, Serial No. 726,204

3 Claims. (Cl. 51—218)

The present invention relates to a tool-bit grinding jig for holding a lathe or shaper cutting tool at a preselected angle during the sharpening thereof on an emery wheel or the like.

In all intricate machine work it is exceedingly imperative that the cutting tool not only be kept sharp for accuracy and speed but also it is equally important that the angle of the cutting edge in no way be altered during resharpening of such cutting tool. This requirement cannot be met by hand grinding no matter how skilled and experienced the machinist may be. Recognizing this, various types of tool holders or gauges are known to the art for holding the cutting tools during sharpening on a grinding wheel. Heretofore, however, such gauges have been very expensive so that the average machinist could hardly afford to have a tool-bit grinding jig as an integral part of his tool kit.

It is accordingly the primary object of the present invention to provide a tool-bit grinding jig which is of simple and economical construction.

Another object of the present invention is the provision of a tool-bit grinding jig which is accurately adjustable to any desired angle and wherein the cost thereof is well within the range of every machinist so that he can readily add the jig to his tool kit.

Still further objects of the present invention will become obvious to those skilled in the art by reference to the accompanying drawing wherein, Figure 1 is a top plan view of the tool-bit grinding jig of the present invention resting on the tool rest table of a grinding wheel, Fig. 2 is a perspective view of the tool-bit grinding jig of the present invention, Fig. 3 is a cross-sectional view taken on the line III—III of Fig. 1 looking in the direction indicated by the arrows.

Fig. 4 is a cross-sectional view taken on the line IV—IV of Fig. 1 looking in the direction indicated by the arrows, and Fig. 5 is an exploded view of the tool-bit grinding jig as shown in the preceding figures.

Referring now to the drawing in detail, the tool-bit grinding jig of the present invention as therein shown comprises a base plate 5 freely movable by an operator over the surface of the usual tool rest table 6 normally disposed in front of a grinding wheel 7. A rectangular two-section block 8 is pivotally connected to this base plate 5, such as by an adjustable locking screw 9, so that this block 8 may be rotated to any desired radial position relative to the longitudinal axis of the base plate 5 and secured in place by tightening of the pivot screw 9. As clearly shown in the drawings the two section block 8 is pivotally connected together by a longitudinally extending shaft-screw 10 fitting into adjacent grooves 12 (Fig. 5), with the two sections 13 and 14 of the block 8 being held together for rotation by this shaft-screw 10 and by a peripherally flanged washer 15 and similar peripherally flanged nut 16 carried thereby which, respectively, fit into mating semi-annular grooves 17 (Fig. 5) provided at each end of the two block sections 13 and 14.

In order to allow the block section 13 to be adjustably rotated about the shaft-screw 10 as a longitudinal pivot, as above-mentioned, it will be noted, particularly from Figs. 3 and 4, that the interface between the block sections 13 and 14 is radially tapered so that upon adjustment of spaced set-screws 18 and 19, the block section 13 is rotated about the shaft-screw 10 to any desired angular position relative to the block section 14, within the limits of the total angle formed by the diverging radially tapered surfaces of the interface of the respective block sections 13 and 14. As shown, the block section 13 is provided with a longitudinal channel 20 extending the full length thereof on the side opposite to that of juncture with the block section 14 and a tool-bit 22 is adapted to be held therein by a pair of clamping screws 23 and 24 which pass through threaded openings in the block section 13 above the channel 20 and into engagement with the tool-bit 22, as shown in Fig. 1 and by the dotted lines in Figs. 2 and 3.

Inasmuch as the block 8 is rotatably adjustable on the base plate 5 about the pivot 9 and the block section 13 is rotatable about the shaft-screw 10, it is apparent that the tool-bit 22 when secured in the channel 20 by the clamping screws 23 and 24 can be adjusted to a preselected angle in two distinct directions, namely, a horizontal plane and a vertical plane relative to the base plate 5, so that when the tool-bit is pushed into engagement with the grinding wheel 7, such tool-bit 22 will be ground and sharpened to the desired preselected angle which will accurately remain the same for each sharpening for every preselected angular setting.

It will also be noted that a still further angular setting for the sharpening of a tool-bit is provided by the grinding jig of the present invention. For example, the block section 14 has a lateral groove 25 extending thereacross and which has an angular bottom surface, as can be seen particularly in Figs. 4 and 5. This groove 25 aligns with a somewhat similar lateral groove 26 in the block section 13 but which has a uniform depth, rather than a varying depth provided by the angularly extending bottom surface of the groove 25. An L-shaped member 27 (Fig. 5) is permanently secured to the block section 13 by a securing screw 28 and has one of its arms parallel with the block section 13 immediately above the lateral groove 26 and through which a clamping screw 29 extends for the purpose of securing a tool-bit 30 in place within the lateral groove 26. By again manipulating the adjusting screws 18 and 19 the block section 13 is rotated about the shaft-screw 10 to position the tool-bit 30 in the desired angular setting for engagement with the grinding wheel 7 to sharpen it, and the angular bottom surface of the groove 25 allows for such angular adjustment by enabling the remainder of the tool-bit to be recessed in such groove at all angular adjustments.

It should thus become obvious to those skilled in the art that a tool-bit grinding jig has been herein provided which is of simple and economical design and hence can be readily procured by the average machinist for a part of his personal tool kit. Moreover, despite the simplicity of such jig it is nevertheless accurate and reliable and once set for the desired angles for sharpening lathe and shaper cutting tools, it will retain such setting for all further sharpening positions with absolute fidelity.

Although one embodiment of the present invention has been herein shown and described, it is to be understood that still further embodiments thereof may be made without departing from the spirit and scope of the invention as set forth in the appended claims.

I claim:

1. A tool bit grinding jig for the sharpening of cutting tools comprising a base plate movable by an operator over the tool rest table of a grinding wheel, a substantially rectangular two-section block, one section of said block being pivotally adjustable on said base plate and the remaining section of said block being longitudinally pivoted to the section pivoted to said base plate and with the interface between said sections being radially tapered to enable the adjustment of said remaining section to various angular positions with respect to the section pivoted to said base plate, adjusting means carried by one of said sections and engageable with the other of said sections to preselect the angular position therebetween within the limits fixed by said radially tapered interface, a longitudinal channel and a transverse channel in said block, and a clamp for securing a cutting tool in either of said channels for sharpening at preselected angles as determined by the adjusted pivoted position of said block relative to said base plate and the adjusted pivotal position of said remaining section relative to the section pivoted to said base plate.

2. A tool-bit grinding jig for the sharpening of cutting tools comprising a base plate movable by an operator over the tool rest table of a grinding wheel, a substantially rectangular two-section block having one section pivotally adjustable on said base plate and the other section being longitudinally pivoted to the section pivotally connected to said base plate and the interface between said two-sections being radially tapered to enable the adjustment of said other section to various angular positions with respect to the section pivoted to said base plate, adjusting screws passing through said section which is connected to said base plate for preselecting the angular position between said sections within the limits fixed by the radially tapered interface therebetween, a longitudinal channel in said other section and aligned transverse channels in both of said sections, and a clamp for securing a cutting tool in either said longitudinal or aligned transverse channels for sharpening at preselected angles as determined by the adjusted pivoted position of said block relative to said base plate and the adjusted pivotal position of said other section relative to the section pivoted to said base plate.

3. A tool-bit grinding jig for the sharpening of cutting tools comprising a substantially rectangular block formed of two parallel adjacent sections longitudinally pivoted together with the interface therebetween radially tapered slightly inward from the axis of said pivotal connection to enable pivoted movement of one section relative to the other, a pair of adjusting screws carried by one of said sections and movable into engagement with the interface of the other of said sections to cause pivotal adjustment of one section to a sustained preselected angle relative to the other of said sections, a longitudinal channel in one of said sections and aligned transverse channels in both of said sections for the reception of a cutting tool in either said longitudinal or aligned transverse channels for sharpening at preselected angles as determined by the adjusted pivotal position of said sections relative to each other.

References Cited in the file of this patent

UNITED STATES PATENTS

| | | |
|---|---|---|
| 1,341,646 | Jesnig | June 1, 1920 |
| 1,428,509 | Weignar | Sept. 5, 1922 |
| 2,401,054 | Daley | May 28, 1946 |